US006825578B2

(12) United States Patent
Perttu

(10) Patent No.: US 6,825,578 B2
(45) Date of Patent: Nov. 30, 2004

(54) STATE MACHINE CONTROLLED AUTOMATIC TRANSFER SWITCH SYSTEM

(76) Inventor: Joseph Perttu, 1000 Lake Susan Hills Dr., Chanhassen, MN (US) 55317

( * ) Notice: Subject to any disclaimer, the term of this patent is extended or adjusted under 35 U.S.C. 154(b) by 211 days.

(21) Appl. No.: 10/055,734

(22) Filed: Jan. 23, 2002

(65) Prior Publication Data

US 2002/0117900 A1 Aug. 29, 2002

Related U.S. Application Data

(60) Provisional application No. 60/263,944, filed on Jan. 24, 2001.

(51) Int. Cl.$^7$ ................................................. H02J 1/00
(52) U.S. Cl. ......................................................... 307/70
(58) Field of Search ..................................... 307/70, 64

(56) References Cited

U.S. PATENT DOCUMENTS

| | | | |
|---|---|---|---|
| 3,646,355 | A | 2/1972 | Ireland et al. |
| 3,936,782 | A | 2/1976 | Moakler et al. |
| 4,021,678 | A | 5/1977 | Moakler et al. |
| 4,157,461 | A | 6/1979 | Wiktor |
| 4,189,649 | A | 2/1980 | Przywozny et al. |

(List continued on next page.)

OTHER PUBLICATIONS

Chow et al., "The Design of an SRAM–Based FPGA–Part I: Architecture",Jun. 1999, IEEE Transactions on VLSI Systems, vol. 7, No. 2.*
*Transfer Switching of Critical Computer Loads*, AsCo Facts, Automatic Switch Co., Florham Park, NJ, vol. 6, No. 8, 6 pgs.; not dated.
Website Print–out: *ASCA® The Power Authority*, Series 300, product information, 2 pgs., Nov. 2000.
*ASCA® Series 300 Automatic Transfer Switches 30 through 800 amps*, Operator's Manual, Automatic Switch Co., Florham Park, NJ, 16 pgs., Copyright 1999.
*ASCA® 940 Suggested Specifications*, Automatic Switch Co., Florham Park, NJ, pp. 10–11, not dated.
Website Print–out: *Guidelines and Practices for the Selection of Automatic Transfer Switches to be Used in DOE Backup Power Supplies (U)*, T.T. Lam, J.H. Janes, Westinghouse Savannah River Company, 10 pgs., 1995.

Primary Examiner—Gregory J. Toatley, Jr.
(74) Attorney, Agent, or Firm—Patterson, Thuente, Skaar & Christensen, P.A.

(57) ABSTRACT

An automatic transfer switch system controls switching of power from a main source (utility power) to a backup source (generator) by using a state machine controller and low cost relay switches housed in a single electrical panel. The low power automated transfer switch system is well-suited for residential use and is less expensive and easier to install than conventional automatic transfer switches. The key to a low cost transfer switch is delivering power with low cost relays. This is accomplished by employing relay drive techniques that enable these devices to survive rigorous standards compliance testing. Preferably, the state machine controller measures utility and generator source compliance using an optical coupling arrangement, rather than a transformer. The automated transfer switch disconnects the utility and generator means through a circuit breaker providing for fast protection. The relay drive techniques disclosed provide a form of an electrical interlock. This is a key feature when seeking compliance standard approval. Essentially, an automated transfer system should not continuously be capable of backfeeding power from generator to utility, and the electrical interlock of the relays as taught by this invention prevents any such backfeeding.

17 Claims, 4 Drawing Sheets

TOP LEVEL BLOCK DIAGRAM

U.S. PATENT DOCUMENTS

| | | | |
|---|---|---|---|
| 4,204,128 A | | 5/1980 | Kruper |
| 4,398,097 A | | 8/1983 | Schell et al. |
| 4,405,867 A | | 9/1983 | Moakler et al. |
| 4,423,336 A | | 12/1983 | Iverson et al. |
| 4,672,227 A | | 6/1987 | Lagree et al. |
| 4,747,061 A | | 5/1988 | Lagree et al. |
| 4,760,278 A | | 7/1988 | Thomson |
| 4,804,933 A | | 2/1989 | Becker et al. |
| 5,023,469 A | | 6/1991 | Bassett et al. |
| 5,070,252 A | | 12/1991 | Castenschiold et al. |
| 5,124,881 A | * | 6/1992 | Motoki .................... 361/605 |
| 5,268,850 A | | 12/1993 | Skoglund |
| 5,581,133 A | * | 12/1996 | Smith et al. ................ 307/64 |
| 5,734,239 A | | 3/1998 | Turner |
| 5,739,594 A | | 4/1998 | Sheppard et al. |
| 5,748,432 A | | 5/1998 | Przywozny et al. |
| 5,784,240 A | | 7/1998 | Przywozny |
| 5,892,297 A | | 4/1999 | Penoyer |
| 5,903,065 A | | 5/1999 | Dragos |
| 5,914,467 A | | 6/1999 | Jonas et al. |
| 5,939,802 A | | 8/1999 | Hornbeck |
| 5,959,448 A | | 9/1999 | Barnaski et al. |
| 6,034,445 A | | 3/2000 | Hewitt |
| 6,100,604 A | * | 8/2000 | Morroni et al. ............. 307/64 |
| 6,172,432 B1 | * | 1/2001 | Schnackenberg et al. ..... 307/64 |
| 6,593,670 B2 | * | 7/2003 | Anderson .................. 307/64 |

* cited by examiner

TOP LEVEL BLOCK DIAGRAM

Pick & Hold Charge Pump (10)

Generator Start/Stop Interface (9)

Power Supply (1)

Power Transfer Relays (11)

Isolated Main Interface (3)

Isolated Generator Interface (4)

STATE MACHINE CONTROLLED AUTOMATIC TRANSFER SWITCH SYSTEM

This application claims the benefit of Provisional application Ser. No. 60/263,944 filed Jan. 24, 2001.

FIELD OF THE INVENTION

The present invention relates generally to the field of backup and standby power systems. More specifically, the present invention relates to an automatic transfer switch system that controls switching of power from a main source (utility power) to a backup source (generator) by using a state machine controller and low cost relay switches housed in a single electrical panel such that the transfer switch system is well suited for residential use and is less expensive and easier to install than conventional automatic transfer switches.

BACKGROUND OF THE INVENTION

Transfer switches are well known for controlling the switching of power from a main source or a secondary or backup source. Most transfer switches have been developed for the very demanding challenges of switching power between sources of more than 10,000 Watts (1OKW). These types of high power transfer switches are usually expensive systems that use multiple electrical panels to implement their function. One panel might house the relays or switching devices that select power from either of two sources for delivery to a load. Another panel might house a microprocessor and associated logic necessary for controlling the switches and providing a user interface. The power that is delivered from the switching device is normally then routed to a distribution panel that provides circuit breaker protection. These high power transfer switch systems are costly to manufacture because of the multiple panels, power switching devices, and complicated logic panel. Often, very quick switching times are needed, which require the use of high cost static switches. In addition, professional installation is required to install such a system adding to the associated costs. This type of high power transfer switch system is generally impractical for the average residential low power application requiring less than 10 KW standby power. For a good background on the issues involved in selection of automatic transfer switches, reference is made to "Guidelines and Practices for the Selection of Automatic Transfer Switches to be used in DOE Backup Power Supplies", DOE Backup Power Working Group, Apr. 20, 1995.

For low power transfer switches intended primarily for residential use, it is most common to utilize a manual switch mechanism. These manual systems typically are designed into a single panel. This panel allows the user to select where power is delivered and from what source it will be supplied. Because the process is manual, it requires the user to toggle switches on and off to turn non-critical loads off and turn critical loads on. In the case where the secondary or backup power source is a generator, the user also is required to start the generator either from the panel or at the generator itself. Typically, manual transfer switches also require professional installation because utility power must be disconnected to allow for installation of the manual transfer switch between the utility meter and the fuse box or circuit panel.

When the operation of a low power transfer switch is automated, the most common approach has been to utilize some form of mechanical switch mechanism that drives a lever that turns off one circuit breaker and then turns on another circuit breaker. Such mechanical switch arrangements are well suited for residential use because they are less expensive and because the mechanical nature of the switching provides an inherent protection against simultaneously connecting the engine generator and the utility power. In a residential application, there is generally no expectation that power will be continuously supplied during the switching from utility power to the generator. As the time required to start an engine generator is significantly longer than the time associated with the operation of the mechanical switch, there is no motivation to use expensive quicker switching arrangements as part of the transfer switch. While various mechanisms for moving the mechanical switch mechanism can be used, a typical example is the use of a solenoid that moves the mechanical switch through a sequence of positions. The rule that a transfer switch must break the first connection before making the second connection is accomplished by insuring that the mechanical switch turns off the first circuit breaker before turning on the second circuit breaker. Examples of this type of electrically operated, mechanically held automatic transfer switches are the ASCO® Series 300 and ASCO® Series 940 transfer switches. These automatic transfer switches have microprocessor controls and can be connected and programmed to start an auxiliary engine generator.

Instead of using a microprocessor to control the automatic transfer switch, some control systems have been implemented using relays and delay timers to control the mechanical operation of a transfer switch. U.S. Pat. Nos. 4,189,649, 4,204,128, 5,892,297 and 5,903,065 describe examples of such control systems that use relays and delay timers. Relays are also used in an automatic bus transfer device as described in U.S. Pat. No. 5,939,802 that controls both single phase and multiphase power systems.

One of the problems with using relay switches in an automatic transfer switch is the need to provide short circuit and continuous over current protection. Relay systems that close contacts into a shorted circuit risk welding of those contacts. All relay systems are susceptible to welding of contacts. For example, if the relay contacts that switch the generator to the load are welded, then removing the energizing source from this relay will not allow the contacts to open. This means the generator is still connected to the load even though the energizing source for the relay system has been removed. If the utility power relay is energized to conduct utility power to the load in this situation, the utility power is now short circuited into the generator. One way to protect relay systems is to provide fast blow fuses; however, these fuses must be replaced when they blow.

Although significant advances have been made with respect to high-power automatic transfer switches, it would be desirable to improve upon existing low-power automatic transfer switches, particularly automatic transfer switches that are intended for residential use.

SUMMARY OF THE INVENTION

The present invention is an automatic transfer switch system that controls switching of power from a main source (utility power) to a backup source (generator) by using a state machine controller and low cost relay switches housed in a single electrical panel. The low power automated transfer switch system is well-suited for residential use and is less expensive and easier to install than conventional automatic transfer switches. The key to a low cost transfer switch is delivering power with low cost relays. This is accomplished by employing relay drive techniques that enable these devices to survive rigorous standards compliance testing. Preferably, the state machine controller measures utility and generator source compliance using an optical coupling arrangement, rather than a transformer. The automated transfer switch disconnects the utility and generator means through a circuit breaker providing for fast protection. The relay drive techniques disclosed provide a form of an electrical interlock. This is a key feature when seeking compliance standard approval. Essentially, an automated transfer system should not continuously be capable of backfeeding power from generator to utility, and the electrical interlock of the relays as taught by this invention prevents any such backfeeding.

In a preferred embodiment, the automated transfer switch has a single electrical panel that houses a first circuit breaker connected to the primary source, a second circuit breaker connected to the backup source, and at least a third circuit breaker connected to a load in the residence. A pair of electrically interlocked power relays are electrically connected between the at least third circuit breaker and the first circuit breaker and the second circuit breaker. Control logic is operably connected to the power relays and includes a state machine controller to control the operation of the power relays to switch from the primary source to the backup source in the event that the control logic detects a decrease in at least one measurable characteristic of the primary source greater than a predetermined value. Preferably, the state machine controller is a field programmable gate array (FPGA) and the first circuit breaker and the second circuit breaker are rated for less than 10 kilowatts. Preferably, the control logic provides control signals to start and stop the engine generator and monitors at least one measurable characteristic of the backup source after it is started before switching from the primary source to the backup source. A simple to operate operator panel is positioned on a front of the electrical panel.

The present invention is also directed to a method of operating the low power automated transfer switch and to a method of installing the lower power automated transfer switch.

DETAILED DESCRIPTION OF THE PREFERRED EMBODIMENT

Figure 5:
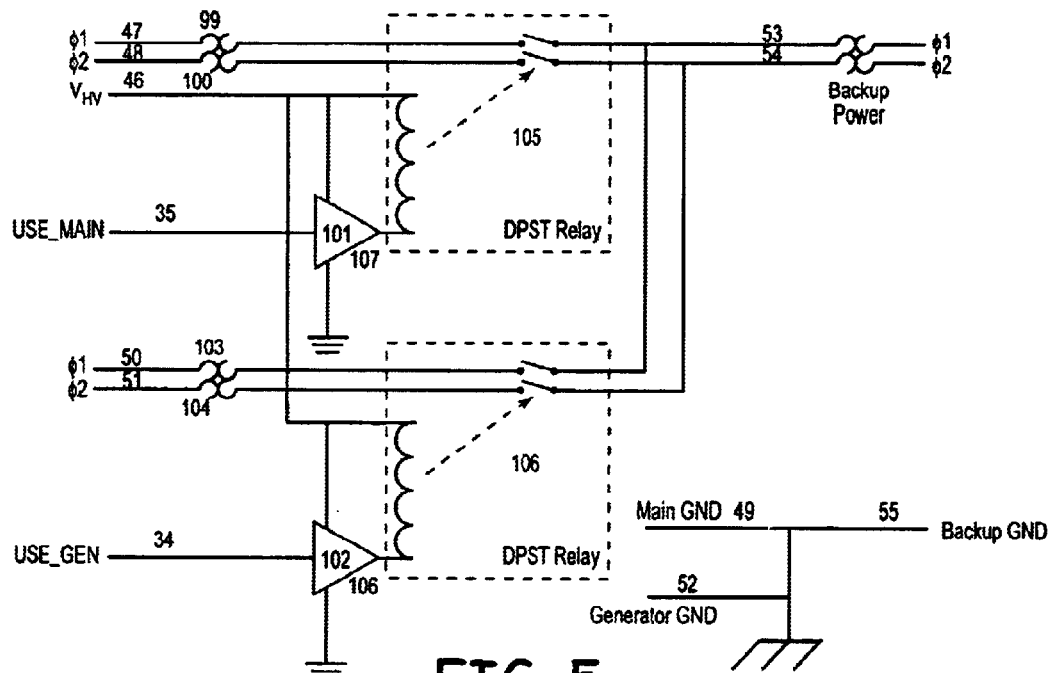
FIG. 5 is a schematic diagram of the power transfer relays.

The amount of current the transfer switch system may deliver to a load is a direct result of the power relays 165 and 106. This will fix an upper limit of power conduction in which this transfer switch may be used. The contacts of typical low cost power relays can handle approximately 60 amps per pole, essentially allowing the relays to service a 10 KW load. This is calculated via 120 Volts×60 amps (per pole)×2(for 2 poles)>10000 Watts. Utility power is commonly delivered as 240 Volts. The potential from 47 to 48 is 240 Volts while their potential to 49 is only 120 Volts. Likewise, 50, 51, and 52 setup similar potentials. FIG. 5 shows two DPST relays that couple either 47 and 48 or 50 and 51 to 53 and 54. Only one of these relays is energized at a time through 35 and 34. 101 and 102 are relay drivers that essentially sink current coupled through the inductors in the relays from 46. Closure time for these relays is very predictable given that they are highly energized with respect to their static energized rating. Because closure time is relatively constant, logic machine 6 times the closure of the relay to be a small positive or negative phase of the supply being delivered. 12, 13, 14, and 15 are sinusoidal sources. When the oscillating voltage on these signals measures zero volts, this is referred to as zero phase. For 60 Hz delivery systems, this happens once approximately every 8 ms. Isolated interfaces 3 and 4 forward rectify the 60 Hz and detect zero phase. This delivers to the logic machine 6 a pulse every 16 ms rather than 8 ms. 6 has been programmed to time closure of 105 and 106 contacts a few milliseconds before and after the rising edge on 17 and 21. 6 alternates between positive and negative compensation. To close the relay contact at zero phase into a short could weld the contacts of the relay. To close it at 90 or 270 degrees phase could set up a standing potential across the contacts that would arc and create excessive heat burning and damaging the contacts. The small shift in phase closure and alternating is to provide consistent wearing of the contacts with reduced arcing for high current situations. 99, 100, 103, and 104 are thermal magnetic resetable breakers. High surge currents that are a result of short circuits will trip the magnetic portion of the breaker. Excessive current delivered for long periods higher than a prescribed rating will trip the thermal portion of the breaker. These breakers protect the relays from excessive currents and help prevent dangerous backfeed currents from generator to utility.

Figure 1:
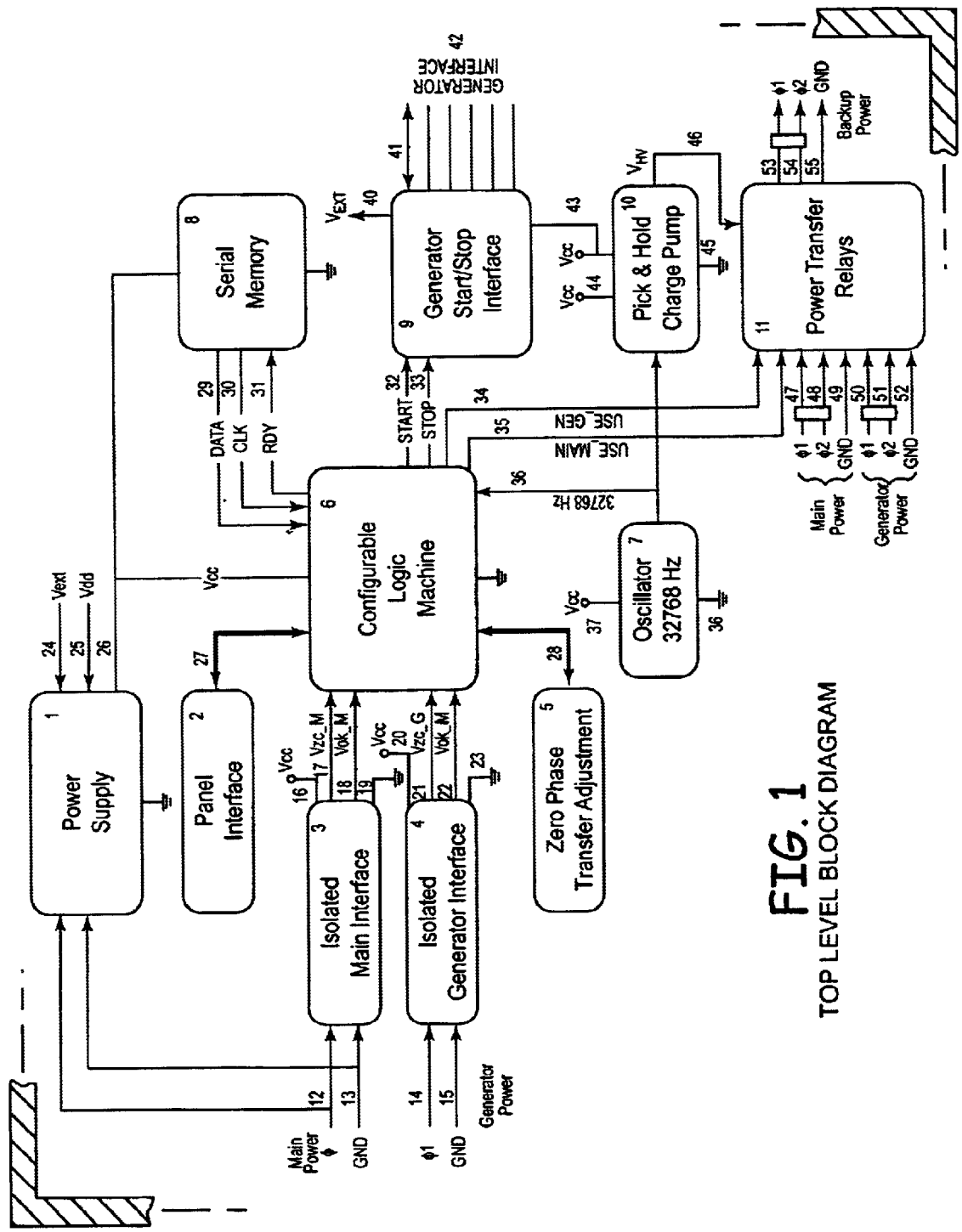
FIG. 1 is a block diagram of the transfer switch system in accordance with the present invention.
Figure 2:
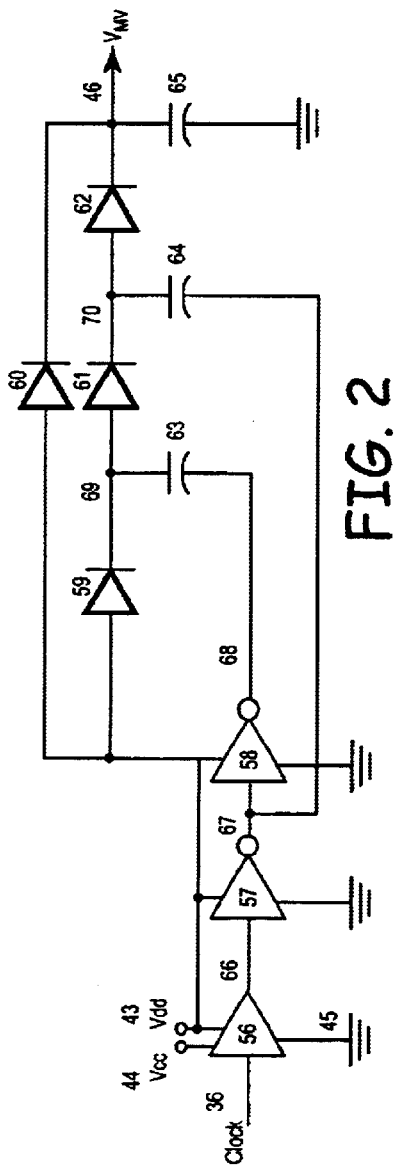
FIG. 2 is a schematic diagram of the pick and hold charge pump.
Figure 3:
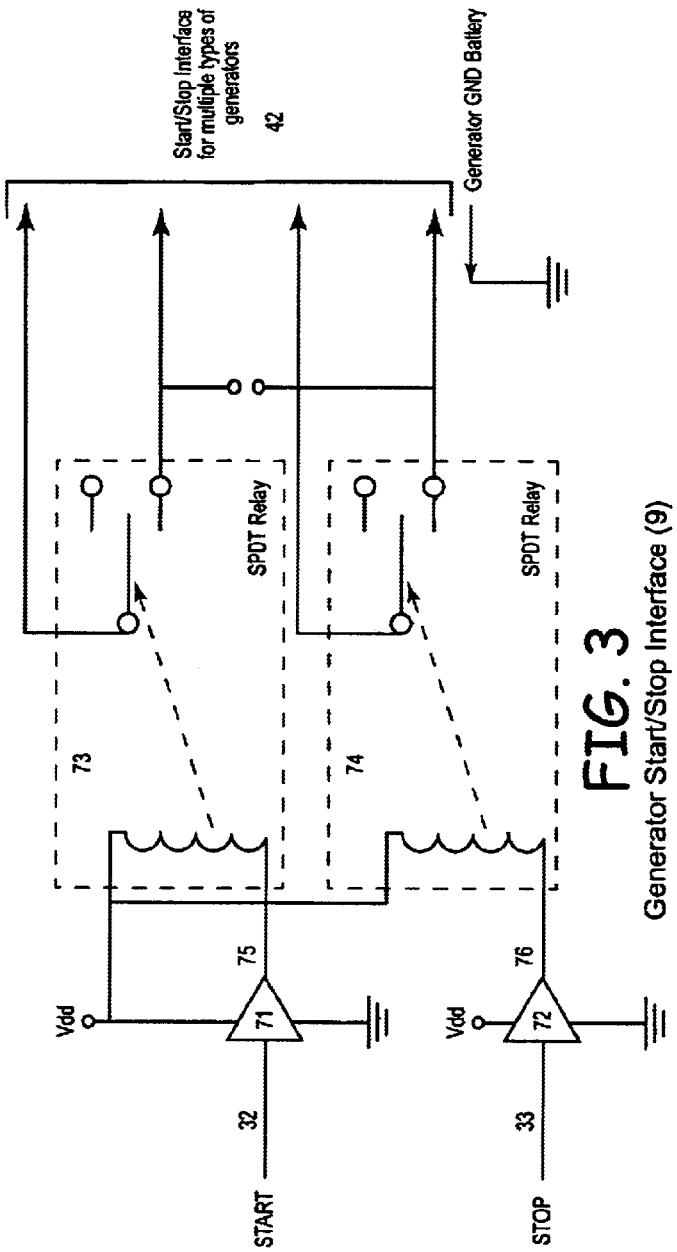
FIG. 3 is a detailed schematic diagram of the generator interface.

46 is coupled from 10. FIG. 2 shows 36 coupled to element 56. 36 is of logic level 44 oscillating at some predetermined frequency. 36 is translated to 66 with logic level voltage consistent with 43. 66 is then coupled to element 57 and then 58. 65 begins with voltage 43. On positive logic level 66, 68 also high forcing 69 to twice level 43. This forward biases 61 to charge 64. This is because 67 is low and 70 is less than 69. 59, 61, 62, and 60 prevent charge from escaping of the capacitors. When 66 is logic low, 67 is now logic high and 68 is logic low. With 67 high, 62 is then forward biased from capacitor 64. 64 then charges 65, while 63 is refreshed to level coupled to it from 43. Net resulting voltage on 65 is three times that provided by 43. When relays 105 and 106 are engaged, the voltage observed at 46 exponentially decays to a point one diode drop below 43. This function is referred to a pick and hold. The relays are picked with an over rated voltage and held with rated voltage. The pick function makes them perform very similarly from relay to relay. This is important because their closure time is programmed into 6. 6 will use this time to work backwards from the intentional closure point to determine when to energize the relays. Adjustments to relay closure time may be made through 5. 5 is coupled to 6 through bus 28. 28 is bus that couples a binary code to 6. Each bit in the code represents a certain amount of delay time.

Figure 4:
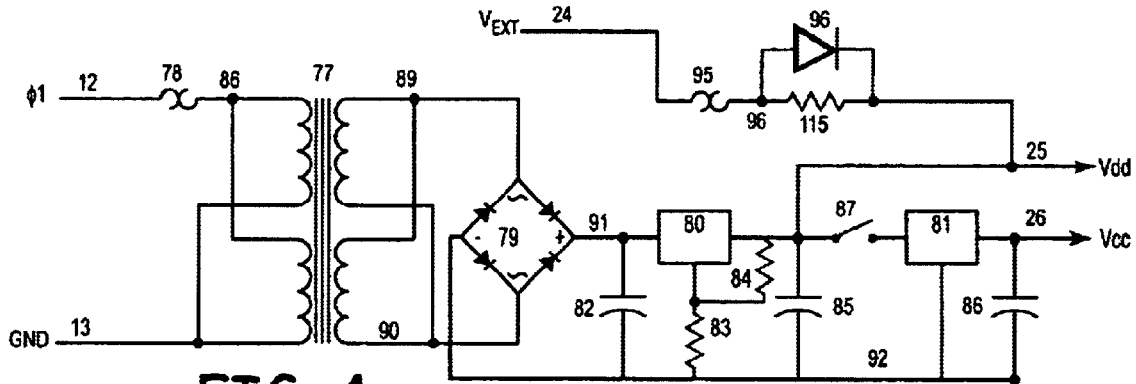
FIG. 4 is a schematic diagram of the power supply for the logic system, power delivery relays, and start/stop relays.

Voltage coupled to 44 and 43 is created from utility power 12 and 13 or 24. FIG. 4 shows the alternating current (AC) to direct current (DC) circuit. Utility power is the main established power source for the system. In the event utility power does not exist, 24 is used to provide the necessary power. 24 is most likely coupled from the generator battery and is shown here to be approximately 12 Volts. It could be greater or less than this, but would then have to be level translated. 12 and 13 are coupled to power transformer 77 through fuse 78. 78 simply protects from unintentional circuit current overload. 77 primary power is coupled to the secondary and bridge rectifier 79. The fill wave rectifier establishes voltage at 91 on 82, a turns ratio of the peak voltage at 12. Three terminal regulator 80 creates regulated voltage coupled to 25. This level is adjustable through selection of components 83 and 84. Second three terminal regulator 81 establishes voltage level Vcc coupled to 26. Voltage 25 may be used to trickle charge external generator battery coupling current through 97. Power coupled via 24 first passes through fuse 95 in the event voltage at 12 is insufficient. This is to prevent overloading generator battery. Power then is coupled through 96.

Figure 6:
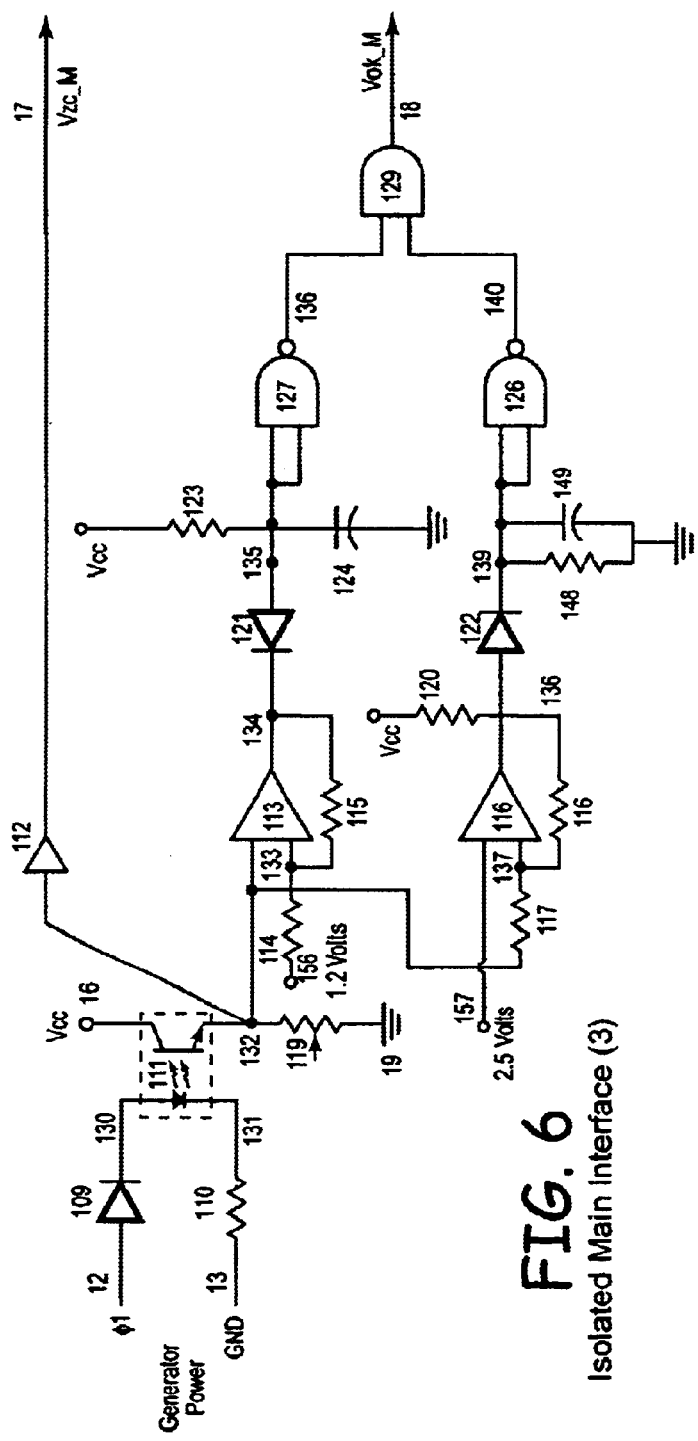
FIG. 6 is a schematic diagram for utility power optical coupling and compliance measurement.

3 provides logic signals 17 and 18 to 6. 18 is logic high when peak voltage measured on 12 is within a prescribed range. 17 is logic high whenever 12 is positive in voltage with respect to 13. This is the zero phase crossing detector. FIG. 6 shows 12 and 13 coupled to diode 109 and resistor 110. 109 lets current only flow one way and provides for voltage protection of opto isolator 111. Positive bias of 12 with respect to 13 forward biases opto diode in 111. Resultant photons are captured by base of transistor in 111 creating current from 16 in proportion to the bias level of opto diode. This proportional current creates voltage at 132 because of trimmable resistor 119. Voltage established at 132 is trimmed to be mid point between 156 and 157. Amplifiers 113 and 116 determine if the peak level of 132 is greater than 156 and less than 157, respectively. This is the desired condition meaning voltage is within a prescribed range. With a this the case, 121 will discharge capacitor 124 because the output of 113 will be low. Likewise, +the output of 116 will be low so that 126 will discharge capacitor 125. With 135 and 139 at logic low, 136 and 140 are logic high creating a logic high coupled to 18. A logic high at 18 means that peak voltage of 12 is within prescribed conditions. If 12 is lower than 156 or greater than 157, amplifiers 113 and 116 create logic highs at 134 and 138, respectively. If this condition persists for a few cycles, levels at 135 or 139 could result in either a logic low at 136 or 140. If this happens, 18 will transition low notifying 6 that utility power is not sufficient to power the load. 132 is likewise coupled to gain element 112 to create a logic level square wave signal. 112 drives line 17 logic high when 12 is positive with respect to 13. It drives it low if otherwise. This signal is used as the zero phase signal in logic machine 6.

Figure 7:
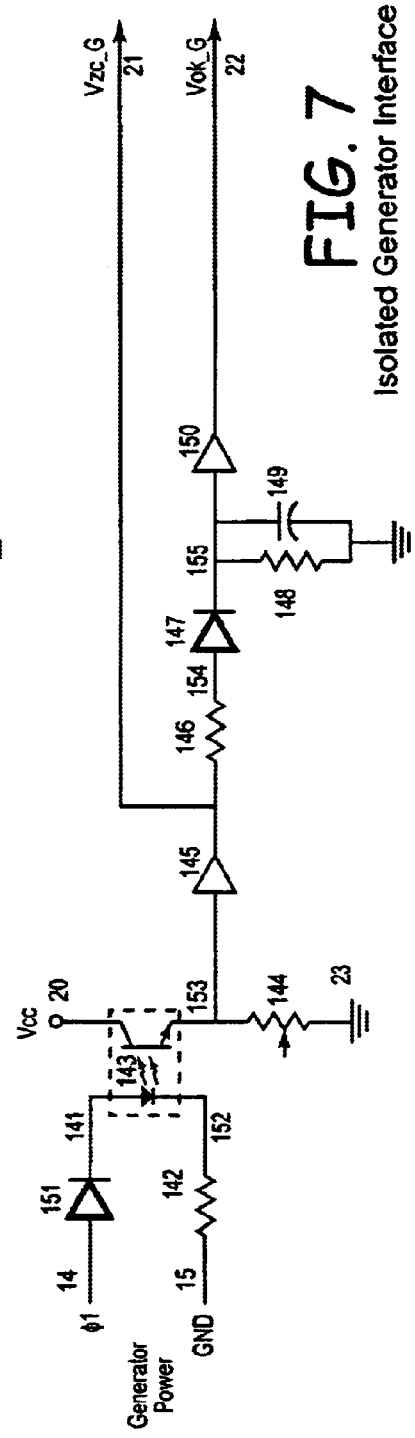
FIG. 7 is a schematic diagram for generator power optical coupling and compliance measurement.

FIG. 7 shows the isolated generator interface. 14 and 15 couple to opto isolator 143 through 141 and 142. Similar to the discussion regarding FIG. 6. Proportional current is established in the opto isolator so that voltage is created at 153 synchronous with phase of 14. Gain element 145 creates zero crossing logic signal coupled to 21. When 21 is logic high, 147 forward biased via coupled element 146 from 21. This establishes voltage at 155. Saved via capacitor 149, as long as periodically 147 is forward biased, 149 will not discharge enough to create a logic low to 150. When 14 is not oscillating, 149 is discharged resulting in a logic low at 22.

Although the preferred embodiment of the automated system of the present invention has been described, it will be recognized that numerous changes and variations can be made and that the scope of the present invention is intended to be defined by the claims.

What is claimed:

1. A low power automated transfer switch for residential use to automatically switch power between a primary source of utility power and a backup source provided by an engine generator, the automated transfer switch comprising:
a single electrical panel housing:
a first circuit breaker connected to the primary source;
a second circuit breaker connected to the backup source;
at least a third circuit breaker connected to a load;
a pair of first and second electrically interlocked power relays, the first power relay electrically connected between the at least third circuit breaker and the first circuit breaker, and the second power relay electrically connected between the at least third circuit breaker and the second circuit breaker; and
control logic operably connected to the power relays and including a state machine controller to control the option of the power relays to switch from the primary source to the backup source in the event that the control logic detects a decrease in at least one measurable characteristic of the prima source greater than a predetermined value.

2. The low power automated transfer switch of claim 1, wherein the state machine controller is a field programmable gate array (FPGA).

3. The low power automated transfer switch of claim 1, wherein the first circuit breaker and the second circuit breaker are rated for less than 10 kilowatts.

4. The low power automated switch of claim 1, wherein the control logic provides control signals to start and stop the backup source.

5. The low power automated transfer switch of claim 4, wherein the control logic monitors at least one measurable characteristic of the backup source after it is started before switching from the primary source to the backup source.

6. The low power automated transfer switch of claim 1, wherein the control logic monitors the primary source via an optical coupling to detect the at least one measurable characteristics.

7. The low power automated transfer switch of claim 1, further comprising an operator panel positioned on a front of hew electrical panel.

8. The low power automated transfer switch of claim 1, wherein the first and second power relays are configurable to simultaneously be in an open circuit state.

9. The low power automated transfer switch of claim 1, wherein at least one of the first and second power relays includes a relay switch configured as a single throw-type switch.

10. The low power automated transfer switch of claim 1, wherein at least one of the first and second power relays is controlled to perform a switching operation only at phase angles corresponding to about zero phase.

11. A method of connecting a low power automated transfer switch for residential use to automatically switch power between a primary source of utility power and a backup source provided by an engine generator, the method comprising:
providing a single electrical panel for the automated transfer switch;
shutting off power in at least a portion of a main electrical panel that distributes the primary source of utility power within the residence;
wiring a first circuit breaker housed in the electrical panel for the automated transfer switch to a circuit break in the main electrical panel;

wiring a second circuit breaker housed in the electrical panel for the automated transfer switch to a connection on the backup source;

wiring at least a third circuit break housed in the electrical panel for the automated transfer switch to at least one load in the residence; and turning power back on to the man electrical panel such that the low power automated transfer switch is installed without that power be physically disconnected from the main electrical panel.

12. The method of claim 11, wherein the first circuit breaker and the second circuit breaker are rated for less than 10 kilowatts.

13. The method of claim 11, further comprising:

wiring control signals from control logic housed in the electrical panel to the backup source to start and stop the engine generator.

14. A method of operating a low power automated transfer switch for residential use to automatically switch power between a primary source of utility power and a backup source provided by an engine generator, the method comprising:

providing a single electrical panel for the automated transfer switch, the sine electrical panel housing having:

a first circuit breaker connected to the primary source, a second circuit breaker connected to the backup source;

at least a third circuit breaker connected to a load; and a pair of first and second electrically interlocked power relays, the first power relay electrically connected between the at least third circuit breaker and the first circuit breaker, and the second power relay electrically connected between the at least third circuit breaker and the second circuit breaker;

detecting a decrease in at least one measurable characteristic of the primary source; and in response, using a state machine to automatically control the operation of the power relays to switch from the primary source to the backup source.

15. The method of claim 14, wherein the automatic controlling of the operation of the power relays includes operating the first and second power relays such that both power relays are simultaneously in an open circuit state.

16. The method of claim 14, wherein the providing includes providing at least one of the first and second power relays that includes a relay switch configured as a single throw-type switch.

17. The method of claim 14, wherein the automatic controlling of the operation of the power relays includes operating at least one of the first and second power relays to perform a switching operation only at phase angles corresponding to about zero phase.

* * * * *